US007089544B2

(12) United States Patent
Hickson

(10) Patent No.: US 7,089,544 B2
(45) Date of Patent: Aug. 8, 2006

(54) JUST IN TIME COMPILATION OF JAVA SOFTWARE METHODS

(75) Inventor: Peter Michael Hickson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 10/385,560

(22) Filed: Mar. 11, 2003

(65) Prior Publication Data

US 2004/0044995 A1 Mar. 4, 2004

(30) Foreign Application Priority Data

Aug. 31, 2002 (GB) ................................ 0220282.8

(51) Int. Cl.
*G06F 9/45* (2006.01)
(52) U.S. Cl. .................................... 717/148
(58) Field of Classification Search ................ 717/148
See application file for complete search history.

(56) References Cited

U.S. PATENT DOCUMENTS

| 6,081,665 | A * | 6/2000 | Nilsen et al. ............. 717/116 |
| 6,110,226 | A * | 8/2000 | Bothner .................... 717/153 |
| 6,118,940 | A * | 9/2000 | Alexander et al. ......... 717/127 |
| 6,139,199 | A * | 10/2000 | Rodriguez ................ 717/159 |
| 6,158,048 | A * | 12/2000 | Lueh et al. ................ 717/118 |
| 6,289,506 | B1 * | 9/2001 | Kwong et al. ............. 717/148 |
| 6,530,075 | B1 * | 3/2003 | Beadle et al. ............. 717/114 |
| 6,546,550 | B1 * | 4/2003 | Ogata et al. .............. 717/148 |
| 6,634,023 | B1 * | 10/2003 | Komatsu et al. .......... 717/159 |
| 6,637,025 | B1 * | 10/2003 | Beadle et al. ............. 717/148 |
| 6,799,262 | B1 * | 9/2004 | Blandy et al. ............. 712/200 |
| 6,799,315 | B1 * | 9/2004 | Waki et al. ................ 717/148 |
| 6,961,843 | B1 * | 11/2005 | O'Connor et al. ......... 712/208 |

OTHER PUBLICATIONS

"The JAVA Virtual Machine Specification" Second Edition, Tim Lindholm et al, Apr. 1999, pp. 51-54, 69-133,457.*
"Overview of the IBM Java Just-in-Time Compiler" IBM Systems Journal, vol. 39, No. 1, 2000, Suganuma et al., pp. 175-193.
Does "Just in Time"="Better Late than Never"? Plezbert et al, Washington University, USA, submitted to 24th Annual SIGPLAN—SIGACT Symposium on Principles of Programming Languages, Paris, France, Jan. 15-17, 1997, pp. 1-9.
The Java HotSpot™ Virtual Machine (Technical White Paper) pp. 1-16, Sun Microsystems, Inc., Apr. 30, 2001 publish date, http://java.sun.com/products/hotspot/docs/whitepaper/Java_HotSpot_WP_Final_4_30 . . . Print date Oct. 30, 2002.

* cited by examiner

*Primary Examiner*—Todd Ingberg
(74) *Attorney, Agent, or Firm*—James E. Boice; Dillon & Yudell

(57) ABSTRACT

A method to just-in-time (JIT) compile Java software methods, the method having the steps of: initializing a first counter for a first software method to a first value, the first value being adjusted each time the first software method is invoked; initializing a second counter for a second software method to a second value, the second value being different from the first value, and the second value being adjusted each time the second software method is invoked; responsive to a determination that the first value exceeds a particular value, JIT compiling the first software method; responsive to a determination that the second value exceeds the particular value, JIT compiling the second software method.

5 Claims, 4 Drawing Sheets

JUST IN TIME COMPILATION OF JAVA SOFTWARE METHODS

FIELD OF THE INVENTION

This invention relates to the just-in-time compilation of software methods in a programming environment. In particular it relates to determining when software methods are to be just-in-time compiled.

BACKGROUND OF THE INVENTION

Java (a trademark of Sun Microsystems, Inc.) is an object oriented programming language and execution environment allowing programmers to define software classes as encapsulated software components comprising data and functionality. The functionality within a Java class is represented by software methods which are executed by a Java virtual machine (JVM). A JVM is a virtual computer implemented as software on a computer system. A JVM includes components necessary to load Java classes and execute software methods written in the Java programming language.

Java classes are written by programmers in the Java programming language using Java instructions. Java instructions are subsequently encoded as platform independent bytecodes by a Java compiler and stored in binary Java class files until they are executed. On execution, the JVM loads a Java class file into memory and executes the software methods it contains. To execute a software method the JVM decodes and executes the bytecode instructions for the software method using a Java interpreter. Decoding a bytecode instruction involves converting the byte code instruction into one or more appropriate machine code instructions for the computer platform. The machine code instructions are subsequently executed by the computer's processor. This model of operation ensures Java classes are stored in platform independent bytecode format until execution, and can be loaded and executed on many computer platforms given the presence of a JVM capable of interpreting bytecodes. Java interpretation takes place for a software method each time the software method is executed.

The need to decode Java bytecodes to machine code prior to execution reduces the rate of execution of Java instructions when compared with that of native compiled programs which are stored as machine code (such as a compiled "C" application). Additionally, repeated execution of the same Java software method requires repeated decoding of the software method's bytecodes by the Java interpreter. To improve the speed of execution of Java instructions and reduce duplication through repeatedly decoding the same bytecodes it is desirable to decode the Java bytecodes in advance of execution. Some JVMs facilitate this by decoding all bytecodes in a software method to machine code and storing the machine code in memory when the software method is first executed. Decoding bytecodes for an entire software method in this way also offers the opportunity to optimize the machine code (such as removing non-operations) to further improve the performance of the executing software method. Once all bytecodes are decoded, the machine code is executed. Subsequent execution of the software method results in further execution of the existing machine code in memory. This technique is known as just-in-time (JIT) compilation because decoding takes place "just in time" for the first execution of a software method. JIT compilers result in a higher rate of execution of Java instructions than Java interpreters, though an initial performance penalty is paid as program execution is delayed while bytecodes are decoded to machine code on first execution. The length of the delay caused by JIT compilation is related to the number of bytecodes comprising a software method, with more bytecodes requiring more time for JIT compilation and therefore a longer delay. Furthermore, where a software method is executed few times (e.g. only once) the use of a JIT compiler with optimization can result in slower overall execution than a Java interpreter.

In "Overview of the IBM Java Just-in-Time Compiler" (IBM Systems Journal 2000 Vol. 39, No. 1, pp 175–193) Suganuma et al. disclose a method for executing Java software methods using a combination of a Java interpreter and a JIT compiler. The method involves providing an invocation count for each software method initialized as a certain threshold value. Whenever the software method is executed by the Java interpreter the JVM decrements the invocation count. When the invocation count reaches zero it is determined that the method has been invoked frequently enough and JIT compilation is initiated for the software method. Once JIT compiled the software method is executed in machine code for the remainder of the execution of the program. This technique offers the benefits of JIT compilation to only those software methods whose invocation count exceeds a determined threshold. Before the threshold is exceeded, software methods are executed using a Java interpreter. The use of the threshold to determine appropriate JIT compilation ensures only software methods which are executed frequently will be JIT compiled to justify the investment of processor time in JIT compilation.

In a transactional environment where software methods are executed in a JVM on a computer system in response to transaction requests from one or more client computer systems, multiple software methods are executed in a repetitive fashion over many transactions. This results in the invocation count for multiple software methods meeting the JIT compilation threshold at the same time, and so multiple software methods are JIT compiled at the same time. JIT compilation of multiple software methods results in an increased performance penalty as program execution is delayed while bytecodes are decoded to machine code for each software method. The transaction that caused software methods to exceed the JIT compilation threshold will experience an unacceptably high delay in the JVM processing of the transaction request as multiple software methods are JIT compiled in the JVM.

SUMMARY OF THE INVENTION

Accordingly the present invention provides a method to just-in-time (JIT) compile software methods in program execution. In accordance with the method of the present invention a first counter is initialized for a first software method to a first value, the first value being adjusted each time the first software method is invoked. A second counter is initialized for a second software method to a second value different to the first value, the second value being adjusted each time the second software method is invoked. Responsive to a determination that the first value exceeds a particular value, the first software method is JIT compiled. Responsive to a determination that the second value exceeds the particular value, the second software method is JIT compiled.

The value of the first counter is different to that of the second counter and the number of software method invocations required for the first counter to exceed a particular value will be different to the number of software method invocations required for the second counter to exceed the particular value. When the software methods are invoked in a repetitive fashion the particular value is not exceeded by both software methods at the same time, and each software method is JIT compiled at a different point in the program execution. This achieves the advantage of ensuring the performance penalty of JIT compilation is limited to a delay of the time required for the JIT compilation of one software method at a time.

According to a second aspect of the present invention there is provided a system to just-in-time (JIT) compile software methods having a unit for initializing a first counter for a first software method to a first value, the first value being adjusted each time the first software method is invoked. The system further has a unit for initializing a second counter for a second software method to a second value different to the first value, the second value being adjusted each time the second software method is invoked. The system further has a unit to determine if the first value exceeds a particular value and a unit to JIT compile the first software method. The system further has a unit to determine if the second value exceeds the particular value and a unit to JIT compile the second software method.

According to a third aspect of the present invention, a computer program product comprising computer program code stored on a computer readable storage medium which, when executed on a data processing system, instructs the data processing system to carry out the method as described above.

BRIEF DESCRIPTION OF THE DRAWINGS

Preferred embodiments of the present invention will now be described in detail by way of example only with reference to the following drawings.

DETAILED DESCRIPTION OF THE PREFERRED EMBODIMENTS

Figure 1:
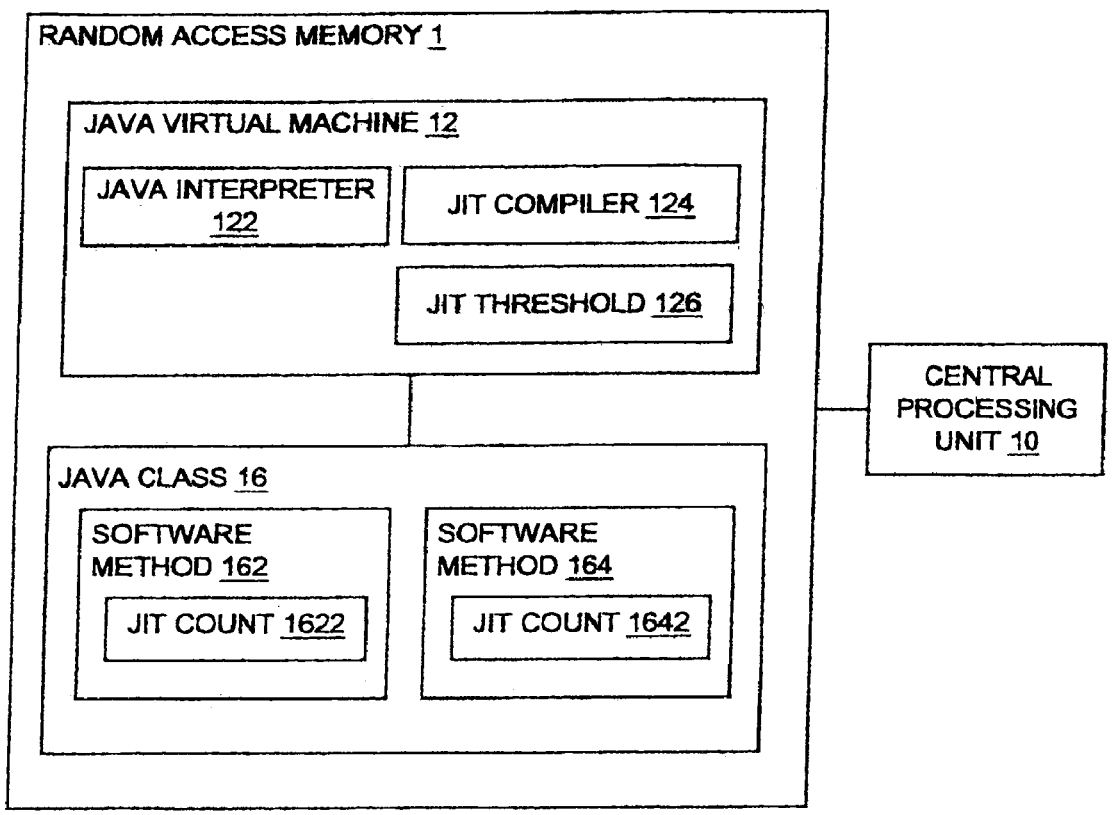
FIG. 1 is a schematic diagram illustrating an arrangement of a computer system running a Java Virtual Machine (JVM) in the prior art.

FIG. 1 is a schematic diagram illustrating an arrangement of a computer system running a Java Virtual Machine (JVM) in the prior art. The computer system includes random access memory (RAM) 1 and a central processing unit (CPU) 10. A Java virtual machine (JVM) 12 is stored in binary form in RAM 1. The JVM 12 is a virtual computer component comprising data and instructions executed by the CPU 10.

Also stored in binary form within RAM 1 is a Java class 16. Java class 16 includes a first software method 162 and a second software method 164, each comprised of one or more bytecodes stored as a plurality of bytes. Software method 162 includes a JIT count 1622 represented as a binary integer value. Software method 164 includes a JIT count 1642 represented as a binary integer value.

The JVM 12 includes a Java interpreter 122 which in use sequentially decodes Java bytecode instructions to machine code appropriate to the CPU 10 and passes the machine code instructions to the CPU 10 for execution. The JVM 12 also includes a just-in-time (JIT) compiler 124 which in use decodes a Java software method stored as Java bytecodes to machine code appropriate to the CPU 10 and stores the machine code in RAM 1 in readiness for execution. The JVM 12 further includes a JIT threshold 126 represented as a binary integer value.

In operation, the JVM 12 initializes JIT counts 1622 and 1642 to the value of the JIT threshold 126. During execution of the JVM 12, JIT count 1622 is decremented at each invocation of software method 162. Similarly, JIT count 1642 is decremented at each invocation of software method 164. JIT counts 1622 and 1642 are used by the JVM 12 to determine if software methods 162 and 164 are to be executed by interpretation using the Java interpreter 122 or compiled using the JIT compiler 124. A value of zero in JIT count 1622 or 1642 indicates the use of the JIT compiler 124, with all other values indicating the use of the Java interpreter 122. Once JIT compiled, software methods 162 and 164 are always executed using the machine code output from the JIT compiler 124 stored in RAM 1.

Figure 2:
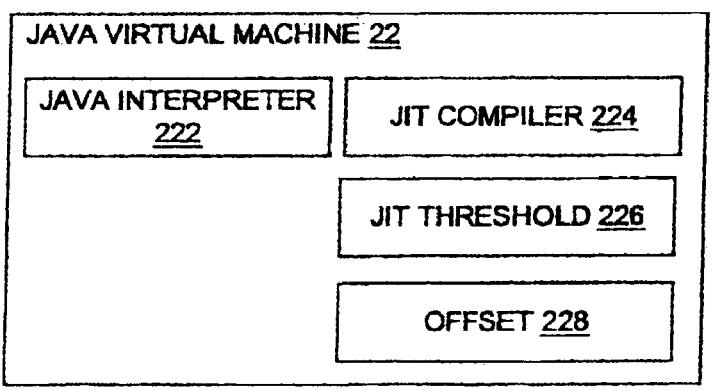
FIG. 2 is a schematic diagram of a JVM according to a first embodiment of the present invention.

FIG. 2 is a schematic diagram of a JVM for use in the RAM 1 of FIG. 1 in a first embodiment of the present invention. The JVM 22 includes a Java interpreter 222, a just-in-time (JIT) compiler 224 and a JIT threshold 226 as described above with respect to FIG. 1. Additionally the JVM 22 further includes an offset 228 represented as a binary integer value.

Figure 3:
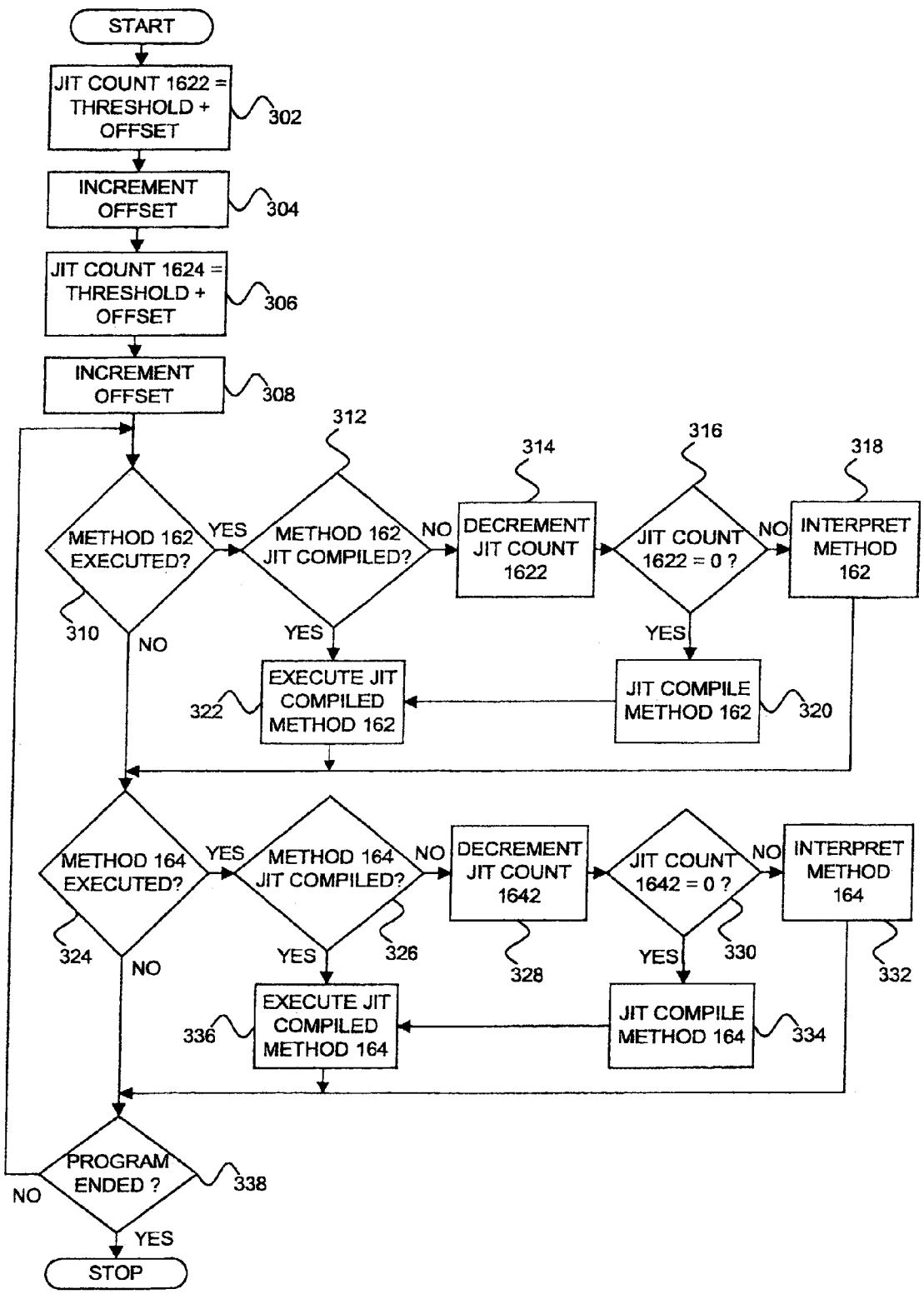
FIG. 3 is a flow chart illustrating a method to JIT compile software methods according to the first embodiment of the present invention.

FIG. 3 is a flow chart illustrating a method to JIT compile software methods in accordance with the first embodiment of the present invention. Initially step 302 initializes JIT count 1622 to the sum of the value of JIT threshold 226 and the value of offset 228. Step 304 increments the offset 228 before step 306 initializes JIT count 1624 to the sum of the value of JIT threshold 226 and the value of the incremented offset 228. The offset 228 is further incremented at step 308. Following step 308 JIT counts 1622 and 1642 contain different initial values. Program execution commences at step 310 which determines if software method 162 has been executed within the JVM 22. If software method 162 has not been executed, the method proceeds to step 324. If software method 162 has been executed, step 312 determines if software method 162 has already been JIT compiled. If software method 162 has been JIT compiled step 322 executes the JIT compiled software method as machine code from RAM 1. If software method 162 has not been JIT compiled JIT count 1622 is decremented by step 314 and tested for a value of zero at step 316. If JIT count 1622 has a value of zero software method 162 is JIT compiled at step 320 by JIT compiler 224 and at step 322 the JIT compiled software method is executed as machine code from RAM 1. If JIT count 1622 does not have a value of zero, software method 162 is executed by the Java interpreter 222 at step 318. Step 324 determines if software method 164 has been executed within the JVM 22. If software method 164 has not been executed, the method proceeds to step 338. If software method 164 has been executed, step 326 determines if software method 164 has already been JIT compiled. If software method 164 has been JIT compiled step 336 executes the JIT compiled software method as machine code from RAM 1. If software method 164 has not been JIT compiled JIT count 1642 is decremented by step 328 and tested for a value of zero at step 330. If JIT count 1642 has a value of zero software method 164 is JIT compiled at step 334 by JIT compiler 224 and the JIT compiled software method is executed at step 336 as machine code from RAM 1. If JIT count 1642 does not have a value of zero, software method 164 is executed by the Java interpreter 222 at step 332. The end of program execution is tested at step 338. If the program has not ended, the method returns to step 310.

In an alternative embodiment, JIT counts 1622 and 1642 are initialized to random values up to a maximum value where the value of JIT count 1622 is not the same as the value of JIT count 1642. Subsequently the method to JIT compile software methods described above and illustrated in FIG. 3 is used starting at step 310.

Figures 4, 5:
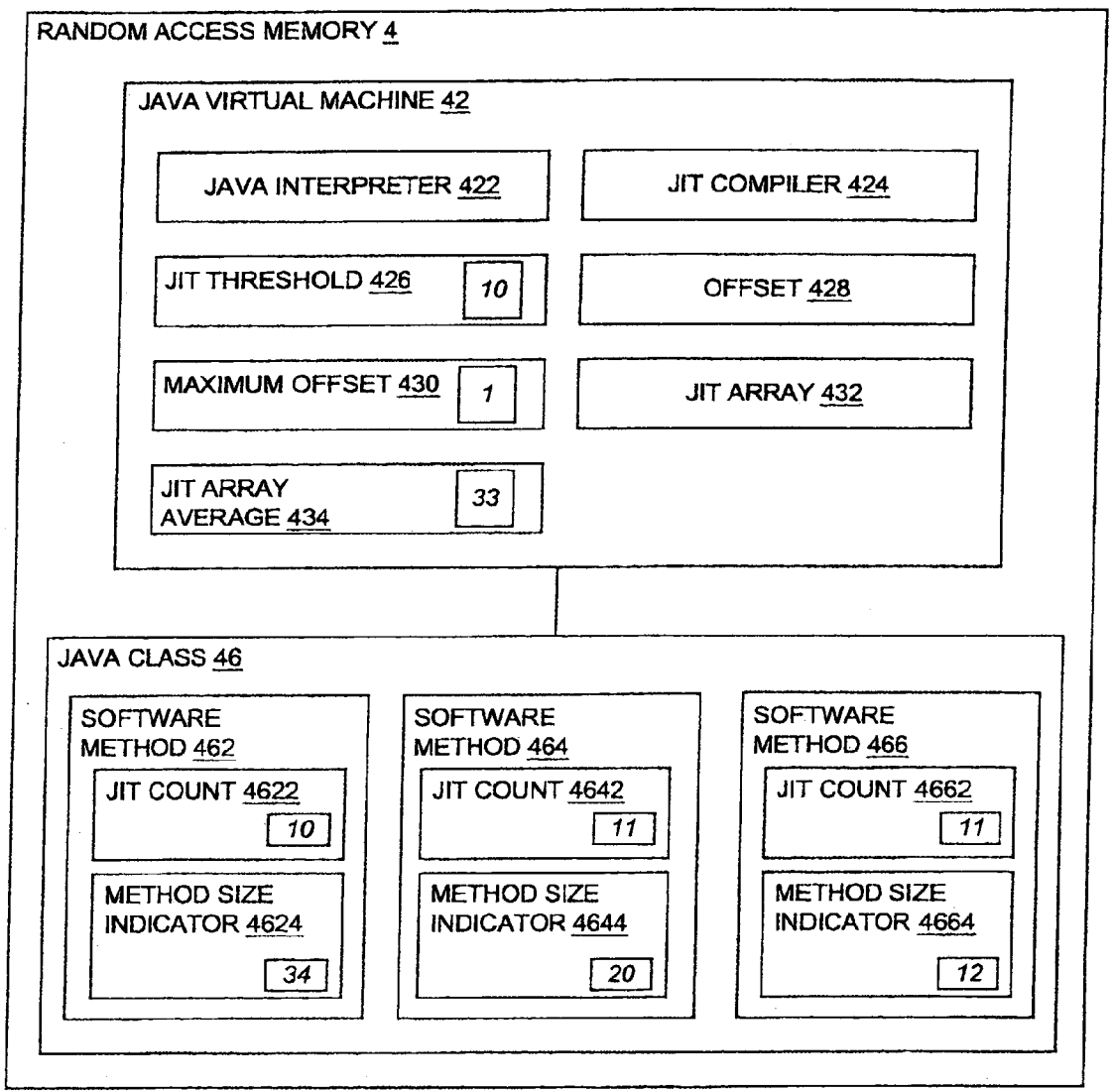
FIG. 4 is a schematic diagram of a configuration of random access memory (RAM) according to a second embodiment of the present invention.
FIG. 5 illustrates the JIT array 432 of FIG. 4.

FIG. 4 is a schematic diagram of a configuration of RAM 4 for use with the CPU 10 of FIG. 1 in a second embodiment of the present invention. A JVM 42 is stored in binary form in RAM 4. Also stored in binary form within RAM 4 is a Java class 46 which includes a first software method 462, a second software method 464 and a third software method 466. Software methods 462, 464 and 466 are each comprised of one or more bytecodes stored as a plurality of bytes. Software methods 462, 464 and 466 include JIT counts 4622, 4642 and 4662 respectively represented as binary integer values. Software methods 462, 464 and 466 further include method size indicators 4624, 4644 and 4664 respectively represented as binary integer values. In operation, a count of the number of bytes comprising software method 462 is assigned to method size indicator 4624. Similarly, a count of the number of bytes comprising software method 464 is assigned to method size indicator 4644, and a count of the number of bytes comprising software method 466 is assigned to method size indicator 4664. The values of method size indicators 4624, 4644 and 4664 are, by way of example, assigned the values "34", "20" and "12", respectively, and are hereinafter considered to represent a measure of the size in bytes of methods 462, 464 and 466 respectively.

The JVM 42 includes a Java interpreter 422, a just-in-time (JIT) compiler 424, a JIT threshold 426 and an offset 428 as in the first embodiment of FIG. 2. The JIT threshold 426 is, by way of example, assigned the value "10". The JVM 42 further includes a maximum offset 430 represented as a binary integer value. The maximum offset 430 is, by way of example, assigned the value "1". The value of the offset 428 can be any integer number between zero and the value of the maximum offset 430 inclusive. In the example illustrated, values of offset 428 are in the range "0" to "1". JVM 42 also includes a JIT array 432 and a JIT array average 434.

FIG. 5 illustrates the JIT array 432 of FIG. 4. JIT array 432 contains a two-column table, with a first column 4322 listing each possible integer value of offset 428, and a second column 4324 listing, alongside a corresponding offset value, the total size in bytes of all software methods with a JIT count value equal to the sum of the JIT threshold 426 and the corresponding value of the offset of the first column 4322.

In the example illustrated, the JIT array 432 has two rows, one for each possible integer value of offset 428. In the first row, for the offset value "0" in column 4322, the total in column 4324 is the total size of all software methods with a JIT count value of "10" (i.e. The sum of the threshold 426 "10" and the offset of the first column 4322 "0"). Only software method 462 has a JIT count value of "10", so the total in column 4324 for the offset value "0" in column 4322 is the size of software method 462. The size of software method 462 is "34" according to the method size indicator 4624.

Similarly, in the second row of JIT array 432, for the offset value "1" in column 4322, the total in column 4324 is the total size of all software methods with a JIT count value of "11" (i.e. The sum of the threshold 426 "10" and the offset of the first column 4322 "1"). Software methods 464 and 466 both have a JIT count value of "11", so the total in column 4324 for the offset value "1" in column 4322 is the total size of software methods 464 and 466. The size of software method 464 is "20" according to the method size indicator 4644, and the size of software method 466 is "12" according to method size indicator 4664. The total size of software methods 464 and 466 is therefore 20+12=32.

The value of the JIT array average 434 is the average of values in column 4324 of JIT array 432. JIT array average 434 is calculated as the sum of all values in column 4324 divided by the number of possible integer values of offset 428. The number of possible integer values of offset 428 is one greater that the value of the maximum offset 430 as values of offset 428 can be any integer number between zero and the value of maximum offset 430 inclusive. Column 4324 of JIT array 432 contains the values "34" and "32", and the maximum offset 430 has the value "1". The average of values in column 4324 can be calculated using (34+32)/(1+1)=33. The JIT array average 434 represents the average size of all software methods assigned the same JIT count value.

In order to reduce delay for JIT compilation in program execution it is beneficial to reduce the total size of all software methods that are JIT compiled after the same number of invocations, and therefore to reduce the total size of software methods with the same JIT count value. When a value is assigned to JIT count 4622 it is therefore advantageous to ensure the total size of all software methods assigned the same value as JIT count 4622 is below the JIT array average 434. Similarly, this applies to JIT counts 4642 and 4662. This ensures the total size of all software methods assigned the same JIT count value is not greater than the JIT array average 434 by more than the size of a single software method.

Figure 6:
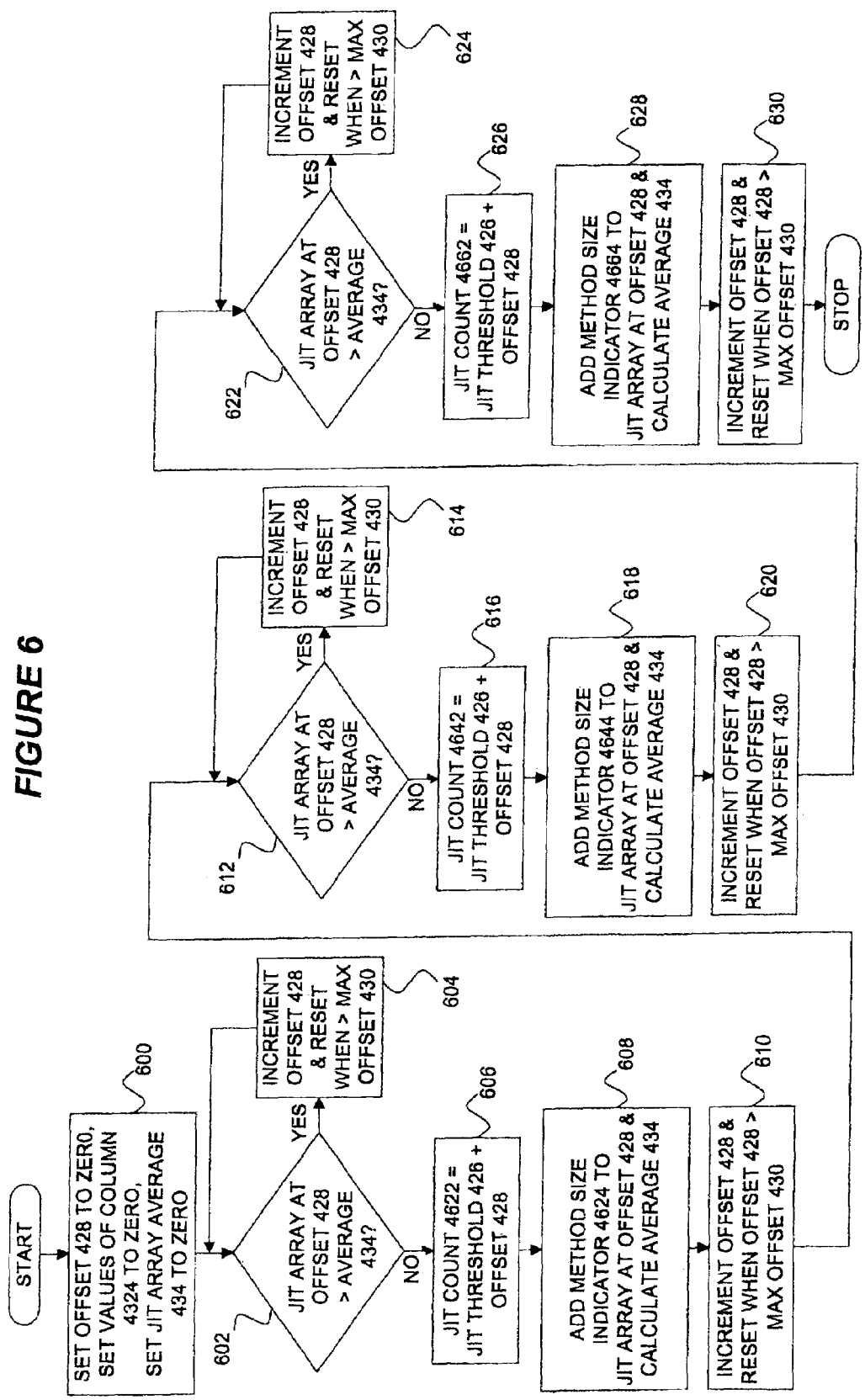
FIG. 6 is a flow chart illustrating a method to initialize the JIT count values 4622, 4642 and 4662 and the JIT array 432 of FIG. 4 for software methods in the second embodiment of the present invention.

FIG. 6 is a flow chart illustrating a method to initialize the values of JIT counts 4622, 4642 and 4662 of software methods 462, 464 and 466 of FIG. 4, and to initialize the JIT array 432 of FIG. 4 in the second embodiment of the present invention. At step 600, the value of offset 428 is set to zero, the value of each element of column 4324 of JIT array 432 is set to zero and JIT array average 434 is set to zero.

Initialization of JIT count 4622 starts at step 602. The value of the element of column 4324 of JIT array 432 corresponding to the current value of offset 428 is checked to determine if it is greater than the value of JIT array average 434. If so, the value of offset 428 is incremented at step 604, and reset to zero if the value of offset 428 exceeds maximum offset 430. If the value of the element of column 4324 of JIT array 432 corresponding to the current value of offset 428 is not greater than the value of JIT array average 434, the JIT count 4622 of software method 462 is initialized to the sum of the value of the JIT threshold 426 and the offset 428 at step 606. The value of the element of column 4324 of JIT array 432 corresponding to offset 428 is increased by the value of method size indicator 4624 at step 608, and the JIT array average 434 is recalculated. At step 610 the value of offset 428 is incremented, and if the value of offset exceeds maximum offset 430 the value of offset is set to zero.

Initialization of JIT count 4642 starts at step 612. The value of the element of column 4324 of JIT array 432 corresponding to the current value of offset 428 is checked to determine if it is greater than the value of JIT array average 434. If so, the value of offset 428 is incremented at step 614, and reset to zero if the value of offset exceeds maximum offset 430. If the value of the element of column 4324 of JIT array 432 corresponding to the current value of offset 428 is not greater than the value of JIT array average 434, the JIT count 4642 of software method 464 is initialized to the sum of the value of the JIT threshold 426 and the offset 428 at step 616. The value of the element of column 4324 of JIT array 432 corresponding to offset 428 is increased by the value of method size indicator 4644 at step 618, and the JIT array average 434 is recalculated. At step 620 the value of offset 428 is incremented, and if the value of offset exceeds maximum offset 430 the value of offset is set to zero.

Initialization of JIT count 4662 starts at step 622. The value of the element of column 4324 of JIT array 432 corresponding to the current value of offset 428 is checked to determine if it is greater than the value of JIT array average 434. If so, the value of offset 428 is incremented at step 624, and reset to zero if the value of offset exceeds maximum offset 430. If the value of the element of column 4324 of JIT array 432 corresponding to the current value of offset 428 is not greater than the value of JIT array average 434, the JIT count 4662 of software method 466 is initialized to the sum of the value of the JIT threshold 426 and the offset 428 at step 626. The value of the element of column 4324 of JIT array 432 corresponding to offset 428 is increased by the value of method size indicator 4664 at step 628, and the JIT array average 434 is recalculated. At step 630 the value of offset 428 is incremented, and if the value of offset exceeds maximum offset 430 the value of offset is set to zero.

Once values of JIT counts 4622, 4642 and 4662 are initialized as described above and illustrated in FIG. 6, execution of software methods proceeds in a similar manner as that described for two software methods in the first embodiment of the present invention and illustrated in FIG. 3 from step 310.

The invention claimed is:

1. A method to just-in-time (JIT) compile Java software methods, the method comprising the steps of:
   initializing a first counter for a first software method to a first value, said first value being adjusted each time said first software method is invoked, wherein initializing the first counter includes adding a threshold value to a threshold offset value to calculate said first value only if a total size of all software methods with counters assigned the first value is not greater than the size of an average of the size of all software method;
   initializing a second counter for a second software method to a second value, and said second value being adjusted each time said second software method is invoked;
   responsive to a determination that the first value exceeds a particular value, JIT compiling said first software method; and
   responsive to a determination that the second value exceeds the particular value, JIT compiling said second software method.

2. A method to just-in-time (JIT) compile Java software methods, the method comprising the steps of:
   initializing a first counter for a first software method to a first value, said first value being adjusted each time said first software method is invoked;
   initializing a second counter for a second software method to a second value, and said second value being adjusted each time said second software method is invoked;
   responsive to a determination that the first value exceeds a particular value, JIT compiling said first software method; and
   responsive to a determination that the second value exceeds the particular value, JIT compiling said second software method, wherein the steps of initializing the first and second counters include adding a threshold value to a threshold offset value to calculate the first value, incrementing the threshold offset value, and adding the threshold value to the incremented offset value to calculate the second value.

3. The method as claimed in claim 1, wherein the second value is different from the first value.

4. An apparatus for just-in-time (JIT) compiling Java software methods, the apparatus comprising:
   means for initializing a first counter for a first software method to a first value, said first value being adjusted each time said first software method is invoked, wherein the means for initializing the first counter includes a means for adding a threshold value to a threshold offset value to calculate said first value only if a total size of all software methods with counters assigned the first value is not greater than the size of an average of the size of all software methods;
   means for initializing a second counter for a second software method to a second value, the second value being different from the first value, and said second value being adjusted each time said second software method is invoked;
   means for, responsive to a determination that the first value exceeds a particular value, JIT compiling said first software method; and
   means for, responsive to a determination that the second value exceeds the particular value, JIT compiling said second software method.

5. The apparatus as claimed in claim 4, wherein the means for initializing the first and second counters includes a means for adding a threshold value to a threshold offset value to calculate the first value, incrementing the threshold offset value, and adding the threshold value to the incremented offset value to calculate the second value.

* * * * *